(12) United States Patent
Shanley et al.

(10) Patent No.: US 7,649,843 B2
(45) Date of Patent: Jan. 19, 2010

(54) METHODS AND APPARATUS FOR CONTROLLING THE FLOW OF MULTIPLE SIGNAL SOURCES OVER A SINGLE FULL DUPLEX ETHERNET LINK

(75) Inventors: Timothy M. Shanley, Orange, CT (US); Robert W. Hamlin, Monroe, CT (US)

(73) Assignee: Transwitch Corporation, Shelton, CT (US)

( * ) Notice: Subject to any disclaimer, the term of this patent is extended or adjusted under 35 U.S.C. 154(b) by 798 days.

(21) Appl. No.: 10/775,013

(22) Filed: Feb. 9, 2004

(65) Prior Publication Data

US 2005/0174941 A1  Aug. 11, 2005

(51) Int. Cl.
*G01R 31/08* (2006.01)
*G06F 11/00* (2006.01)
*H04J 1/16* (2006.01)
*H04J 3/14* (2006.01)
*H04L 12/28* (2006.01)
*H04L 12/56* (2006.01)

(52) U.S. Cl. .................. 370/235; 370/236; 370/252; 370/253; 370/389; 370/392

(58) Field of Classification Search .............. 370/236, 370/412, 415, 428, 429, 229, 240, 235, 252, 370/253, 389, 392, 466, 467, 468; 710/57
See application file for complete search history.

(56) References Cited

U.S. PATENT DOCUMENTS

| | | | | |
|---|---|---|---|---|
| 5,103,446 A | * | 4/1992 | Fischer | 370/236 |
| 5,210,829 A | * | 5/1993 | Bitner | 710/57 |
| 5,946,313 A | * | 8/1999 | Allan et al. | 370/397 |
| 5,995,491 A | * | 11/1999 | Richter et al. | 370/263 |
| 6,011,805 A | * | 1/2000 | Esteve et al. | 370/468 |
| 6,026,075 A | * | 2/2000 | Linville et al. | 370/236 |
| 6,029,202 A | * | 2/2000 | Frazier et al. | 709/232 |
| 6,115,356 A | | 9/2000 | Kalkunte et al. | |
| 6,115,390 A | * | 9/2000 | Chuah | 370/443 |
| 6,167,029 A | * | 12/2000 | Ramakrishnan | 370/235 |
| 6,173,331 B1 | | 1/2001 | Shimonishi | |
| 6,252,888 B1 | * | 6/2001 | Fite et al. | 370/466 |
| 6,490,271 B1 | * | 12/2002 | Erjanne | 370/347 |
| 6,625,118 B1 | | 9/2003 | Hadi Salim et al. | |

(Continued)

OTHER PUBLICATIONS

"Media Access Control (MAC) Service Specification": IEEE Std. 802.3-2002.

(Continued)

*Primary Examiner*—Chi H Pham
*Assistant Examiner*—Farah Faroul
(74) *Attorney, Agent, or Firm*—Gordon & Jacobson, PC (57) ABSTRACT

Methods for providing flow control of signal streams over a single full duplex ETHERNET link include receiving multiple data streams over a single ETHERNET link, associating a buffer with each data stream, putting received data into the appropriate buffer, monitoring the fullness of the buffers, and transmitting a PAUSE frame to the source of the data streams where the PAUSE frame indicates the fullness of each buffer. The PAUSE frame is read and where indicated, the transmission of data destined for a congested buffer(s) is halted until a subsequent PAUSE frame is received which indicates that the congested buffer(s) has become decongested. Apparatus for performing the methods are also provided.

55 Claims, 10 Drawing Sheets

FIG.2B

U.S. PATENT DOCUMENTS

| | | | |
|---|---|---|---|
| 6,646,985 B1 | 11/2003 | Park et al. | |
| 7,242,683 B2 * | 7/2007 | Saint Etienne et al. | 370/389 |
| 2002/0146023 A1 * | 10/2002 | Myers | 370/412 |
| 2002/0181499 A1 * | 12/2002 | Kfir et al. | 370/466 |
| 2003/0067872 A1 | 4/2003 | Harrell et al. | |
| 2003/0147347 A1 * | 8/2003 | Chen et al. | 370/229 |
| 2003/0185249 A1 * | 10/2003 | Davies et al. | 370/535 |
| 2004/0028405 A1 * | 2/2004 | Unitt et al. | 398/32 |
| 2005/0013250 A1 * | 1/2005 | Kauschke et al. | 370/235 |
| 2005/0182848 A1 * | 8/2005 | McNeil et al. | 709/235 |
| 2005/0201415 A1 * | 9/2005 | Narsinh et al. | 370/469 |
| 2006/0050808 A1 * | 3/2006 | Page | 375/295 |
| 2008/0285437 A1 * | 11/2008 | Polland | 370/219 |

OTHER PUBLICATIONS

IEEE Standards for Local and Metropolitan Area Networks: Virtual Bridged Local Area Networks; Lan Man Standards Committee of the IEEE Computer Society Dec. 1988.

* cited by examiner

FIG. 3A (PRIOR ART) FORMAT 1: DA(6) | SA(6) | TYPE/LENGTH(2) | PAYLOAD | FCS(4)

FIG. 3B FORMAT 2: ADDR+PARITY(2) | DA(6) | SA(6) | TYPE/LENGTH(2) | PAYLOAD | FCS(4)
← GENERIC PACKET PAYLOAD →

FIG. 3C FORMAT 3: DA(6) | SA(6) | 802.1Q TAG TYPE(2) | MUX-MODE ADDR TAG(2) | TYPE/LENGTH(2) | PAYLOAD | FCS'(4)
STACKED GMII MUX-MODE ADDRESS TAG MAPPED ONTO 802.1Q VLAN TAG FORMAT
CLIENT MAC TYPE/LENGTH

FIG. 3D FORMAT 3 (VARIANT): DA(6) | SA(6) | 802.1Q TAG TYPE(2) | VLAN ID(2) | TYPE/LENGTH(2) | PAYLOAD | FCS'(4)
RE-USE OF EXISTING 802.1Q VLAN ID AS 1-TO-1 MAP TO A VIRTUAL PORT
CLIENT MAC TYPE/LENGTH

FIG. 4

FORMAT 2 (PREPENDED VIRTUAL PORT ADDRESS)

| 15 | | | | | 10 | 9 | 8 | | | | | | | | 0 |
|---|---|---|---|---|---|---|---|---|---|---|---|---|---|---|---|
| NOT USED=1's | | | | | | P | VIRTUAL PORT NUMBER | | | | | | | | |

- VIRTUAL PORT NUMBER (0-511)
- PARITY BIT (ODD)

SET TO 1'S TO AVOID ALIASING AS A MAC CONTROL FRAME

FIG. 5

FORMAT 3 (VLAN-STYLE ADDRESS MAPPED ON "TAG CONTROL INFORMATION")

| 15 | | | 12 | 11 | | 9 | 8 | | | | | | | | 0 |
|---|---|---|---|---|---|---|---|---|---|---|---|---|---|---|---|
| NOT USED | | | NU | NOT USED | | | VIRTUAL PORT NUMBER | | | | | | | | |

- VIRTUAL PORT NUMBER (0-511)
- 3 MSB's OF VLAN ID=0 (NOT USED)
- CFI=CANONICAL FORMAT INDICATOR=0 (NOT USED)
- USER PRIORITY=0 (NOT USED)

| FIG.8A |
| FIG.8B |

FIG.8

METHODS AND APPARATUS FOR CONTROLLING THE FLOW OF MULTIPLE SIGNAL SOURCES OVER A SINGLE FULL DUPLEX ETHERNET LINK

BACKGROUND OF THE INVENTION

1. Field of the Invention

This invention relates broadly to telecommunications. More particularly, this invention relates to methods and apparatus for controlling the flow of multiple SONET signal streams over a single full duplex ETHERNET link.

2. State of the Art

The TRANSWITCH ETHERMAP-12 is a highly integrated OC-12 mapper for carrying ETHERNET traffic over SONET/SDH networks utilizing Virtual Concatenation (VCAT). It supports STM-4/STS-12/STS-12c rates using a parallel telecom bus operating at 77.76 MHz. The device supports up to eight 10 Mbps or 100 Mbps ETHERNET ports using the SMII interface standard or a single Gigabit (1,000 Mbps) ETHERNET port using the GMII interface standard.

When the ETHERMAP-12 is operated in the SMII mode, eight FIFOs are provided, one for each ETHERNET port, each ETHERNET port being associated with one SONET port, virtual port or virtual concatenated group (VCG). Each FIFO has a high and a low threshold point which are associated with defined Xon (transmit data on) and Xoff (transmit data off) conditions. When a FIFO exceeds the Xoff threshold, a pause frame is generated. The pause duration is programmable and is identified in the pause frame. When the FIFO re-crosses the Xon threshold, a pause frame with a very short pause duration is generated. When operated in the SMII mode, the ETHERMAP-12 can support an OC-3 ring (155 Mbps) by combining two of the eight ETHERNET ports.

When the ETHERMAP-12 is operated in Gigabit mode, a single FIFO is provided for the single Gigabit ETHERNET port. In this mode, the ETHERMAP-12 supports a single OC-12 ring (622 Mbps). It would be desirable to multiplex a plurality of SONET ports, virtual ports or virtual concatenated groups (VCGs) over the single Gigabit ETHERNET link. For example, it would be desirable to support multiple OC-3 rings in the Gigabit mode of the ETHERMAP-12.

SUMMARY OF THE INVENTION

It is therefore an object of the invention to provide methods and apparatus for multiplexing multiple signal sources over a single full duplex ETHERNET link.

It is another object of the invention to provide methods for multiplexing multiple signal sources over a single full duplex ETHERNET link using existing equipment.

It is a further object of the invention to provide methods for multiplexing multiple signal sources over a single full duplex ETHERNET link using an ETHERMAP-12 chipset.

It is also an object of the invention to provide methods for multiplexing a plurality of SONET ports over a single full duplex ETHERNET link using existing equipment.

It is an additional object of the invention to provide methods for multiplexing a plurality of SONET signal sources over a single full duplex gigabit ETHERNET link.

It is still another object of the invention to provide methods for multiplexing a plurality of SONET signal sources over a single full duplex gigabit ETHERNET link using existing equipment.

It is yet another object of the invention to provide methods and apparatus which provide flow control for a multiplexed plurality of signal sources over a single ETHERNET link.

It is still another object of the invention to provide methods and apparatus for controlling the flow of multiple signal sources over a single ETHERNET link.

In accord with these objects, which will be discussed in detail below, methods for providing flow control according to the invention include receiving multiple data streams over a single ETHERNET link, associating a buffer with each data stream, putting received data into the appropriate buffer, monitoring the fullness of the buffers, and transmitting a PAUSE frame to the source of the data streams, the PAUSE frame indicating the fullness of each buffer. The methods for controlling the flow according to the invention include reading the PAUSE frame and halting the transmission of data destined for a congested buffer(s) until a subsequent PAUSE frame is received which indicates that the congested buffer(s) has become decongested. Apparatus for performing the methods are also provided.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
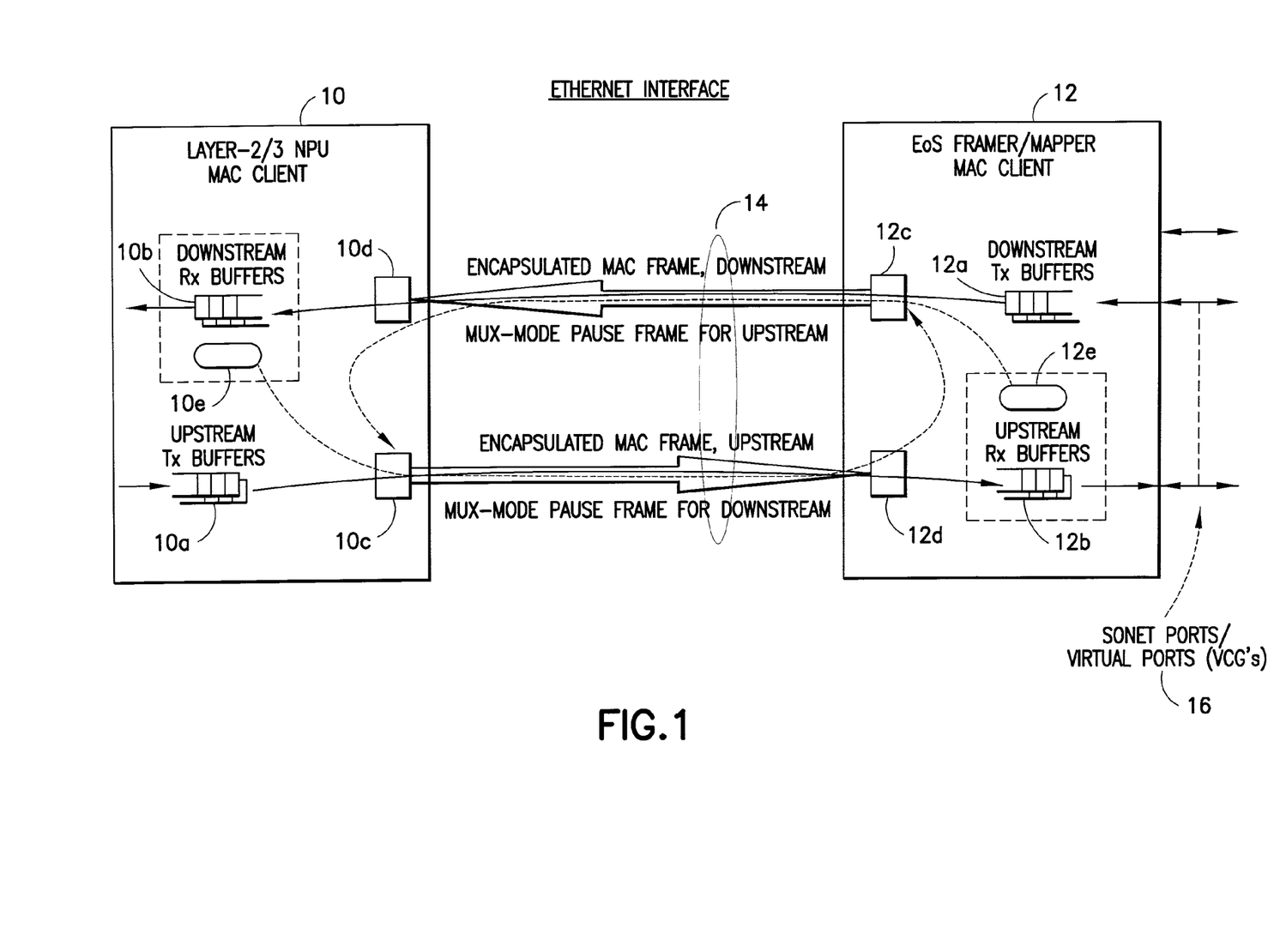
FIG. 1 is a high level schematic diagram illustrating bi-directional operation of the invention.

Turning now to FIG. 1, the invention is illustrated in a high level form with reference to a Layer 2/3 NPU (network processing unit) MAC (machine access control) client 10 and an ETHERNET over SONET (EoS) framer/mapper MAC client 12. The clients 10, 12 are coupled to each other by a full duplex gigabit ETHERNET link 14. As illustrated in FIG. 1, traffic from left to right is considered to be upstream to a plurality of SONET ports or VCGs 16. Thus, the client 10 is provided with a plurality of upstream transmit buffers 10a (one for each data stream), a plurality of downstream receive buffers 10*b*, an upstream transmit addressing and scheduling module 10*c*, a downstream receive addressing module 10*d*, and a receive congestion monitor 10*e*. Similarly, the client 12 is provided with a plurality of downstream transmit buffers 12*a*, a plurality of upstream receive buffers 12*b*, a downstream transmit addressing and scheduling module 12*c*, an upstream receive addressing module 12*d*, and a receive congestion monitor 12*e*.

According to the invention, the upstream transmit addressing and scheduling module 10*c* receives a packet from one of the buffers 10*a* and encapsulates it in a modified MAC frame which includes an identification of which one of the destination ports 16 should receive the packet. The upstream receive addressing module 12*d* receives the MAC frame, decapsulates the packet and places the packet in one of the buffers 12*b* which corresponds to the destination port. The upstream receive congestion monitor 12*e* monitors the fullness of the buffers 12*b* and, when appropriate, generates a modified PAUSE control frame. The control frame is transmitted downstream by the downstream transmit addressing and scheduling module 12*c*, is received by the downstream receive addressing module 10*d*, and is used to control the upstream transmit addressing and scheduling module 10*c*. In particular, the control frame causes the upstream transmit addressing and scheduling module 10*c* to cease transmitting packets destined for the congested buffer 12*b*. When congestion is relieved, a control frame indicating so is transmitted to the downstream receive addressing module 10*d* which causes the upstream transmit addressing and scheduling module 10*c* to resume transmitting packets to the decongested buffer.

Data traffic flow in the down stream direction operates in a similar manner. Packets received from the SONET ports 16 are placed in downstream transmit buffers 12*a* (one for each SONET port). These packets are each encapsulated by the downstream transmit addressing and scheduling module 12*c* in a modified MAC frame which includes an identification of which one of the destination buffers 10*b* should receive the packet. The downstream receive addressing module 10*d* receives the MAC frame, decapsulates the packet and places the packet in one of the buffers 10*b*. The downstream receive congestion monitor 10*e* monitors the fullness of the buffers 10*b* and, when appropriate, generates a modified PAUSE control frame. The control frame is transmitted upstream by the upstream transmit addressing and scheduling module 10*c*, is received by the upstream receive addressing module 12*d*, and is used to control the downstream transmit addressing and scheduling module 12*c*. In particular, the control frame causes the downstream transmit addressing and scheduling module 12*c* to cease transmitting packets destined for the congested buffer 10*b*. When congestion is relieved, a control frame indicating so is transmitted to the upstream receive addressing module 12*d* which causes the downstream transmit addressing and scheduling module 12*c* to resume transmitting packets to the decongested buffer.

Figure 2:
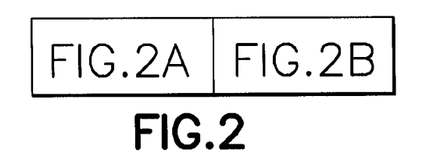
FIG. 2 is a high level schematic diagram illustrating the details of flow control in one direction.
Figure 2A:
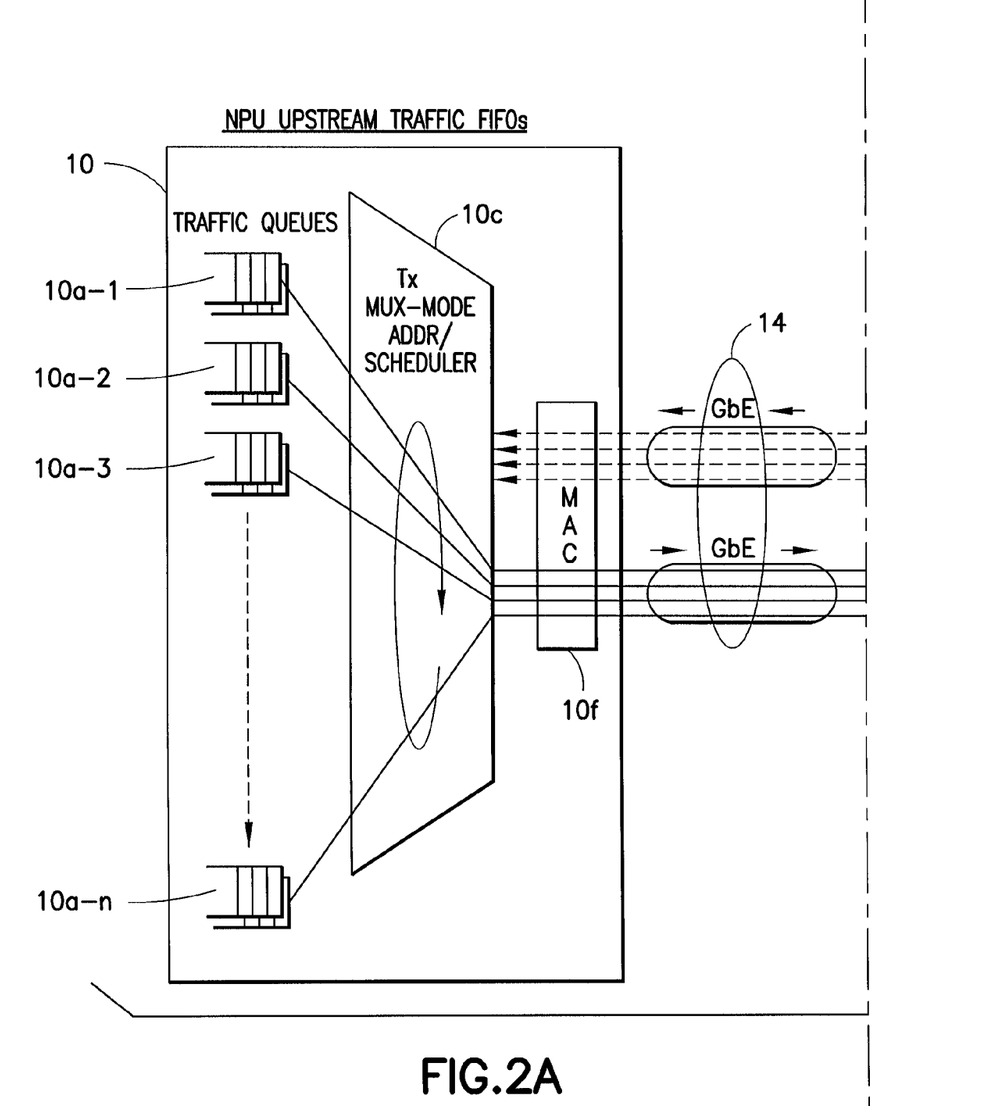
Figure 2B:
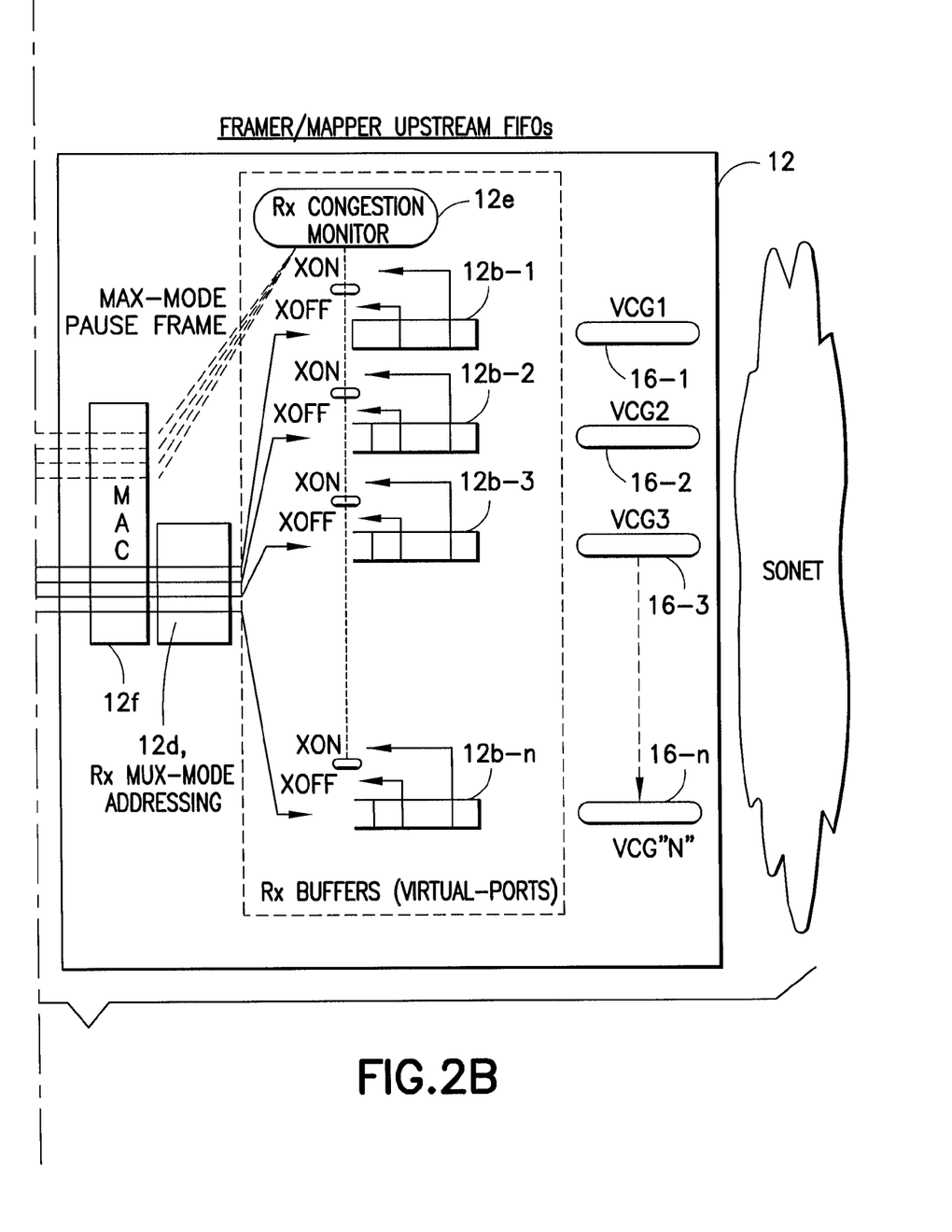

FIG. 2 shows more detail of the upstream flow of ETHERNET traffic flowing from left to right with the PAUSE Frame flow control flowing from right to left. Independent flow control loops are shown in the downstream direction by dotted lines. Depending on the application, flow control in both directions may not be necessary. For example, flow control may not be required for traffic flowing from an EoS Framer/Mapper 12 to an NPU device 10. Traffic management with large buffering capacity is typically located in the NPU 10 and the EoS Framer 12 functions as a streaming device.

Upstream packets from buffers 10*a*-1 . . . 10*a*-*n* are multiplexed by the transmit addressing and scheduling block 10*c*. The packets are encapsulated in MAC frames containing an address tag by the MAC block 10*f*. The MAC frames are decapsulated by the MAC block 12*f*. Details of the MAC blocks can be found in IEEE Standard 802.3-2002, Section One, paragraphs 2 through 4.4.3, pages 33-82, the complete disclosure of which is hereby incorporated by reference herein. The address tag is removed from the MAC frame by the receive addressing block 12*d* which recovers the original Ethernet packet and stores the PDUs in the appropriate Virtual Port FIFOs 12*b*-1 . . . 12*b*-*n* based on the address tag. Each Virtual Port FIFO is associated with a SONET Port or VCG 16-1 . . . 16-*n*. The receive congestion monitor 12*e* monitors the fill levels of the Virtual Port FIFOs 12*b*-1 . . . 12-*b*-*n* and sends PAUSE Control Frames when required to throttle the arrival of data frames for Virtual Port FIFOs that are nearing their buffering capacity. The PAUSE Control Frames are generated by the congestion monitor 12*e* and sent to the remote transmit addressing and scheduling block 10*c* in the remote ETHERNET client 10. Scheduling and transmission of packets to congested FIFOs is temporarily halted based on the content of the PAUSE Control Frames. As the Virtual Port FIFO becomes decongested, another PAUSE Control Frame is sent to resume scheduling for the affected FIFO.

Figure 3A:
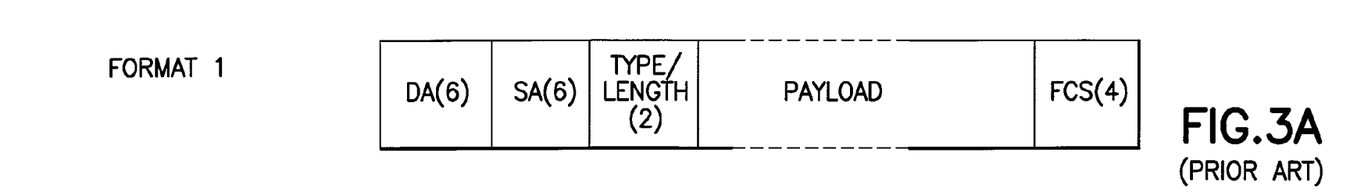
FIG. 3A is an illustration of a prior art PDU MAC Encapsulation format.

An important feature of the invention is the modified MAC frame. FIG. 3A shows a standard gigabit ETHERNET MAC frame. It includes a six byte destination address DA, a six byte source address SA, a two byte Type/Length indicator, a variable length Payload, and a four byte frame check sum FCS.

Figure 3B:
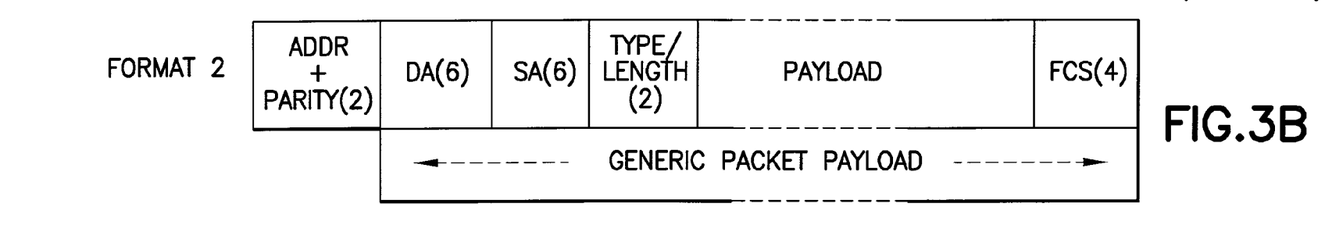
FIG. 3B is an illustration of a modified PDU MAC Encapsulation format according to a first embodiment of the invention.
Figure 4:
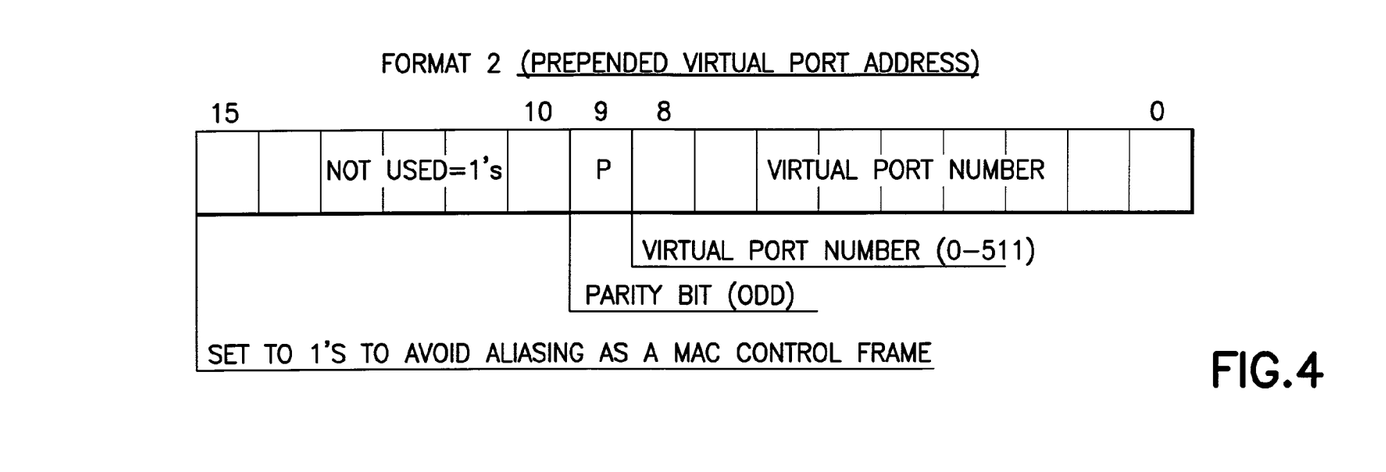
FIG. 4 is a more detailed illustration of the modified PDU MAC Encapsulation format according to the first embodiment of the invention.

According to a first, though not presently preferred, embodiment of the invention, a two byte address and parity indicator is pre-pended to the MAC frame as shown in FIG. 3B. According to this embodiment, the address tag is nine bits LSB justified and optionally protected by an odd parity bit. This format is not preferred because it is not "well formed" and will cause errors at the receiving MAC interface unless the interface is programmed to expect the extra two bytes at the start of each frame. FIG. 4 more clearly illustrates the arrangement of address bits for this embodiment. Bits 15-10 are set to ones so that the frame does not appear as a MAC control frame. Bit 9 is the optional odd parity bit and bits 8-0 are the virtual port number.

Figure 3C:
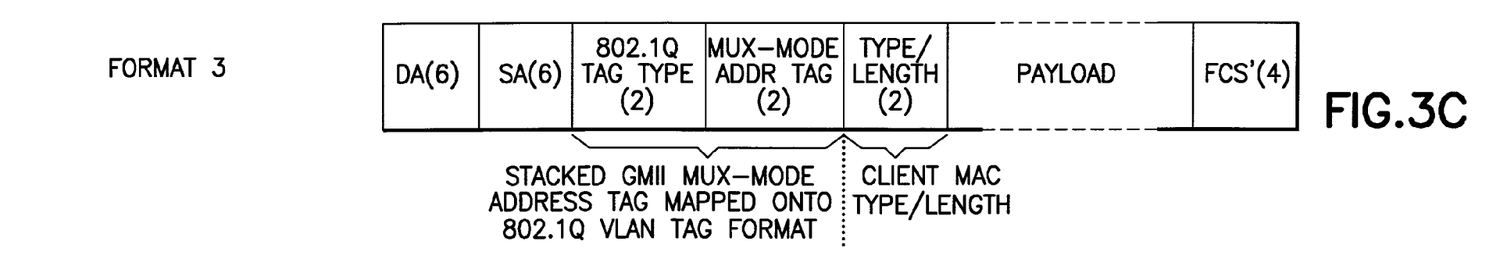
FIG. 3C is an illustration of a modified PDU MAC Encapsulation format according to a second embodiment of the invention.
Figure 5:
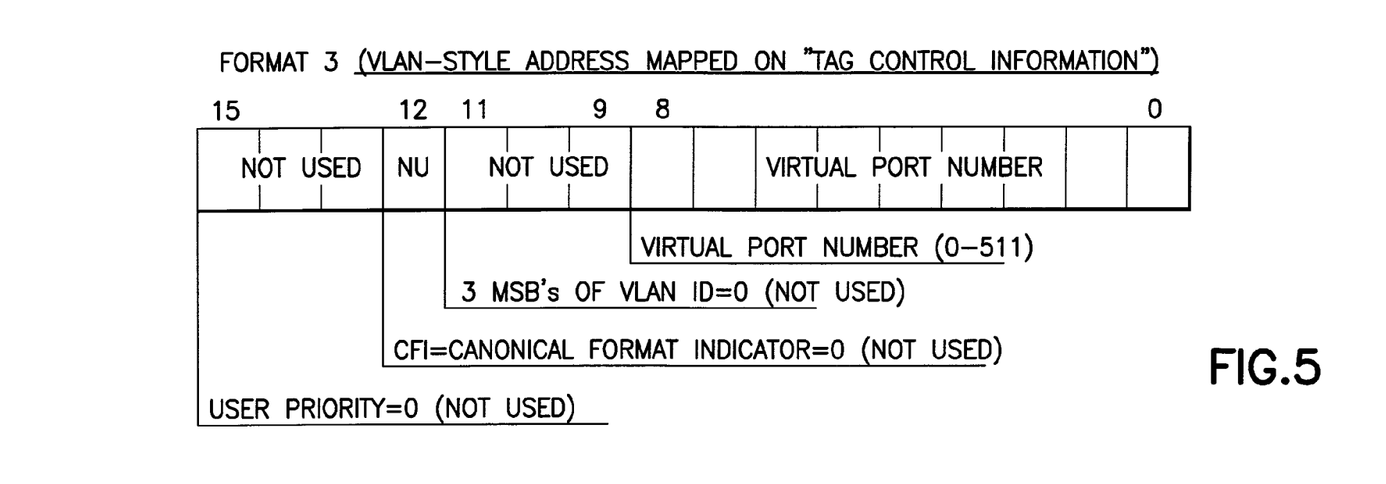
FIG. 5 is a more detailed illustration of the modified PDU MAC Encapsulation format according to the second embodiment of the invention.

According to a second, and presently preferred, embodiment, the address tag is mapped onto a standard (IEEE 802.1Q) VLAN stacked label. In this embodiment, which is illustrated in FIG. 3C, the frame check sum bytes reflect the additional VLAN fields. FIG. 5 more clearly illustrates the arrangement of bits for this embodiment. Bits 15-9 are set to zeros and bits 8-0 are used for the virtual port number.

Figure 3D:
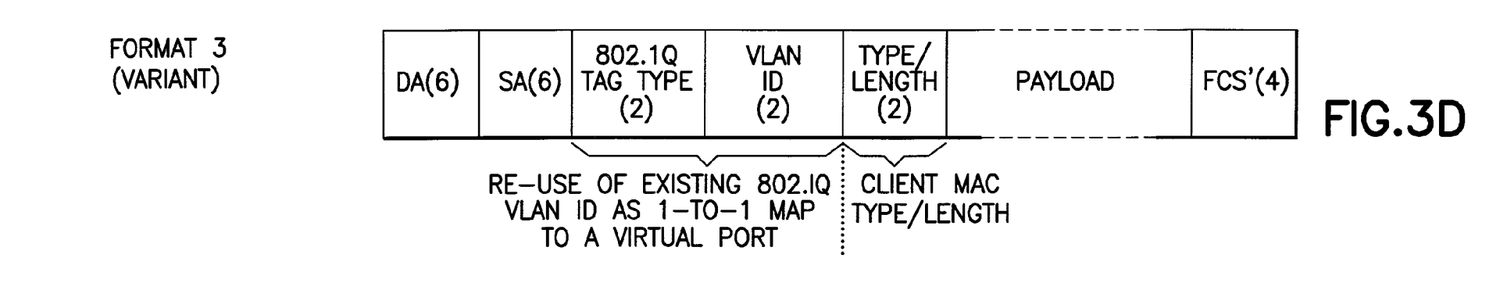
FIG. 3D is an illustration of a modified PDU MAC Encapsulation format according to a third embodiment of the invention.
Figure 6:
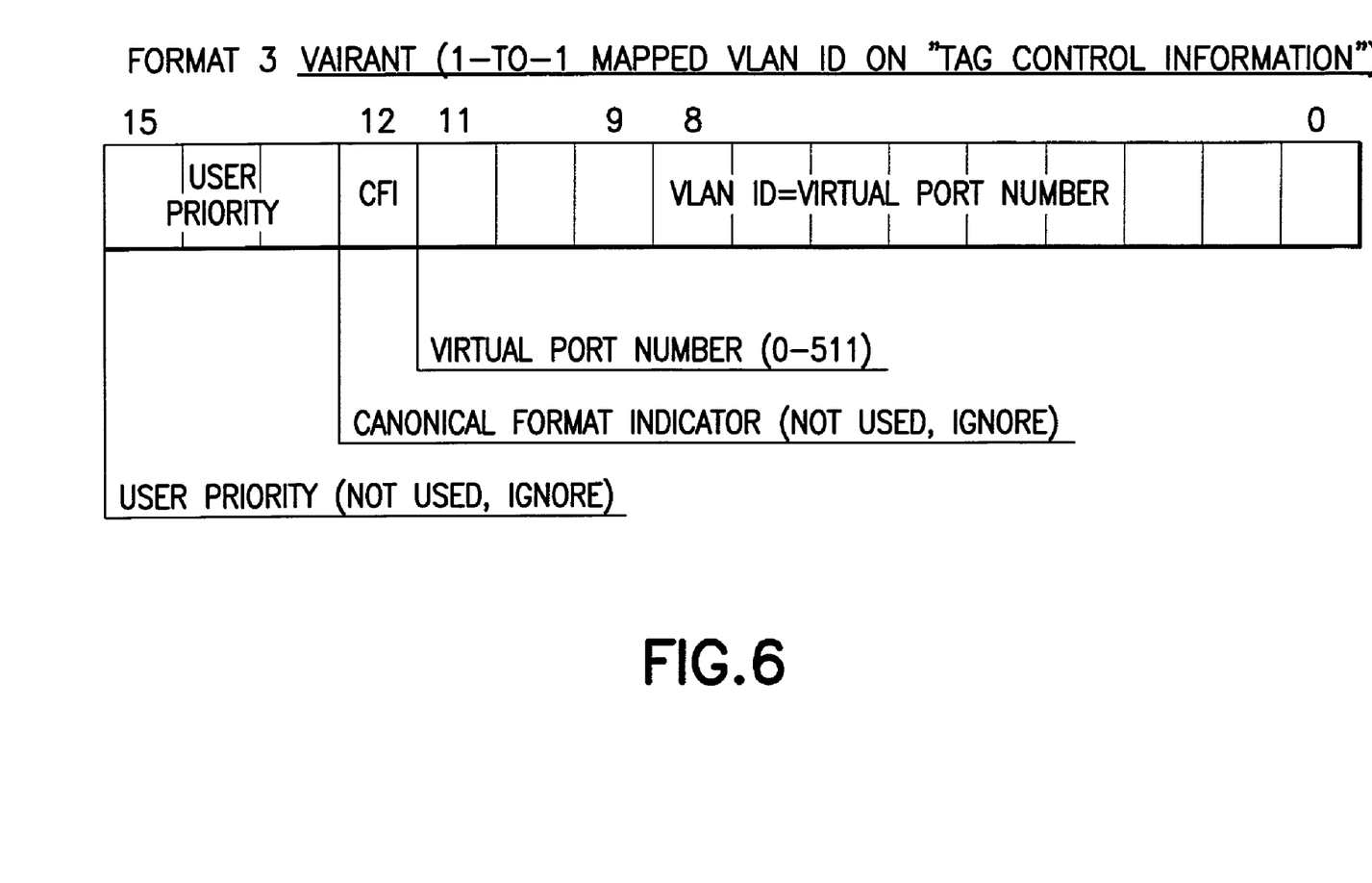
FIG. 6 is a more detailed illustration of the modified PDU MAC Encapsulation format according to the third embodiment of the invention.

A variant of the embodiment is shown in FIG. 3D wherein an existing VLAN ID in the frame is mapped to a virtual port address. This variant can only be used where there is a 1:1 correspondence between VLAN IDs and virtual port addresses. Both of these addressing methods (i.e. the embodiments of FIGS. 3C and 3D) are well-formed and will not produce errors at the receiving MAC interface. FIG. 6 more clearly illustrates the bits of the VLAN ID which are mapped to a virtual port address. Bits 15-12 are ignored and bits 11-0 are mapped to a virtual port number.

Figure 7:
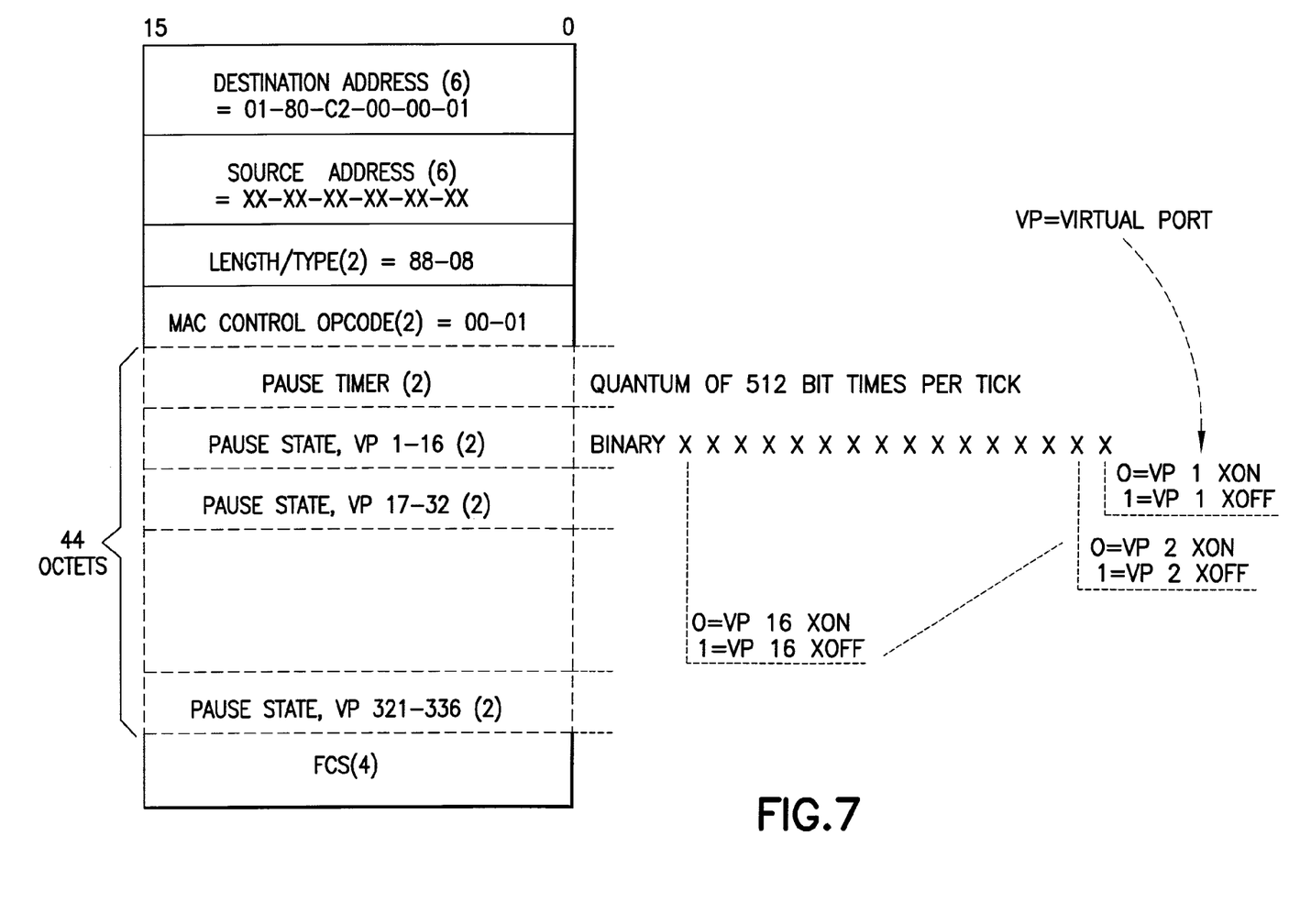
FIG. 7 is a schematic illustration of a modified pause frame according to the invention.

Another important feature of the invention is the use of a modified PAUSE control frame. FIG. 7 illustrates a modified PAUSE control frame according to one embodiment of the invention. Like all MAC frames, the PAUSE control frame has a header which includes a six byte destination address field, a six byte source address field, and a two byte length/type field. A two byte MAC control opcode follows the header and the control frame message follows. Since the minimum frame size for gigabit ETHERNET is 64 octets, a minimum of 44 octets is available for the control frame message which is followed by a four byte frame check sum. According to the presently preferred embodiment of the invention, the minimum frame size is used for the PAUSE control frame. Following the MAC control opcode, a sixteen bit PAUSE timer field contains one of two timer values and following the timer field are three hundred thirty-six bits corresponding to three hundred thirty-six virtual ports. Each of these bits indicates the state of the associated port, e.g. 0=XON, 1=XOFF.

According to the presently preferred embodiment of the invention, four programmable timer values are provided. The first is the "Pause_Time_Value", a 16-bit Read/Write timer value that is configurable from the host interface and is one of the two values assumed by the PAUSE timer field in the PAUSE control frame. The other value assumed by the PAUSE timer field is zero.

The second timer value is the "Pause_Delay_Timer", a 16-bit Read/Write timer that is configurable from the host interface. Each timer tick is in units of 512 bit times on the gigabit ETHERNET interface. The Pause_Delay_Timer represents an XON/XOFF transition "window" in which multiple virtual ports will have their state changes accumulated and sent in a single PAUSE Control Frame to the remote MAC client. A value of 1 indicates that a new PAUSE Control Frame is allowed to be generated every 512 bit times or 512 ns. A value of 65535 indicates that a new PAUSE Control Frame is allowed to be generated every 33.5 ms. Larger values limit the percentage of bandwidth that can be occupied by PAUSE Control Frames at the cost of increased latency. Use of this timer is OPTIONAL if the third timer, the "Pause_Refresh_Timer" is used to send periodic updates continuously.

The "Pause_Refresh_Timer" is a 16-bit Read/Write timer that is configurable from the host interface. Each timer tick is in units of 512 bit times on the gigabit ETHERNET interface. The Pause_Refresh_Timer represents a periodic refresh rate to the remote MAC client when there have been no transitions in virtual port XON/XOFF states for the refresh time period. This timer is properly set to a value that is slightly lower than the Pause_Time_Value in order to guarantee that extended XOFF states are refreshed before the timer expires on the remote MAC client.

The fourth timer is the "Pause_Delay_Timer_Tx". This is a 16-bit timer that is updated with the timer value supplied in the received PAUSE Control Frames from the remote MAC client. When at least one port is in the XOFF state, a value of one is expected to be present in at least one of the PAUSE state bit fields. When all ports are in the XON state, a value of zero is expected to be present in all of the PAUSE state bit fields. The timer begins decrementing at the rate of one tick every 512 bit times after it is updated from the PAUSE Control Frame. When the timer reaches zero, all virtual ports return to the XON state.

Figures 8, 8B:
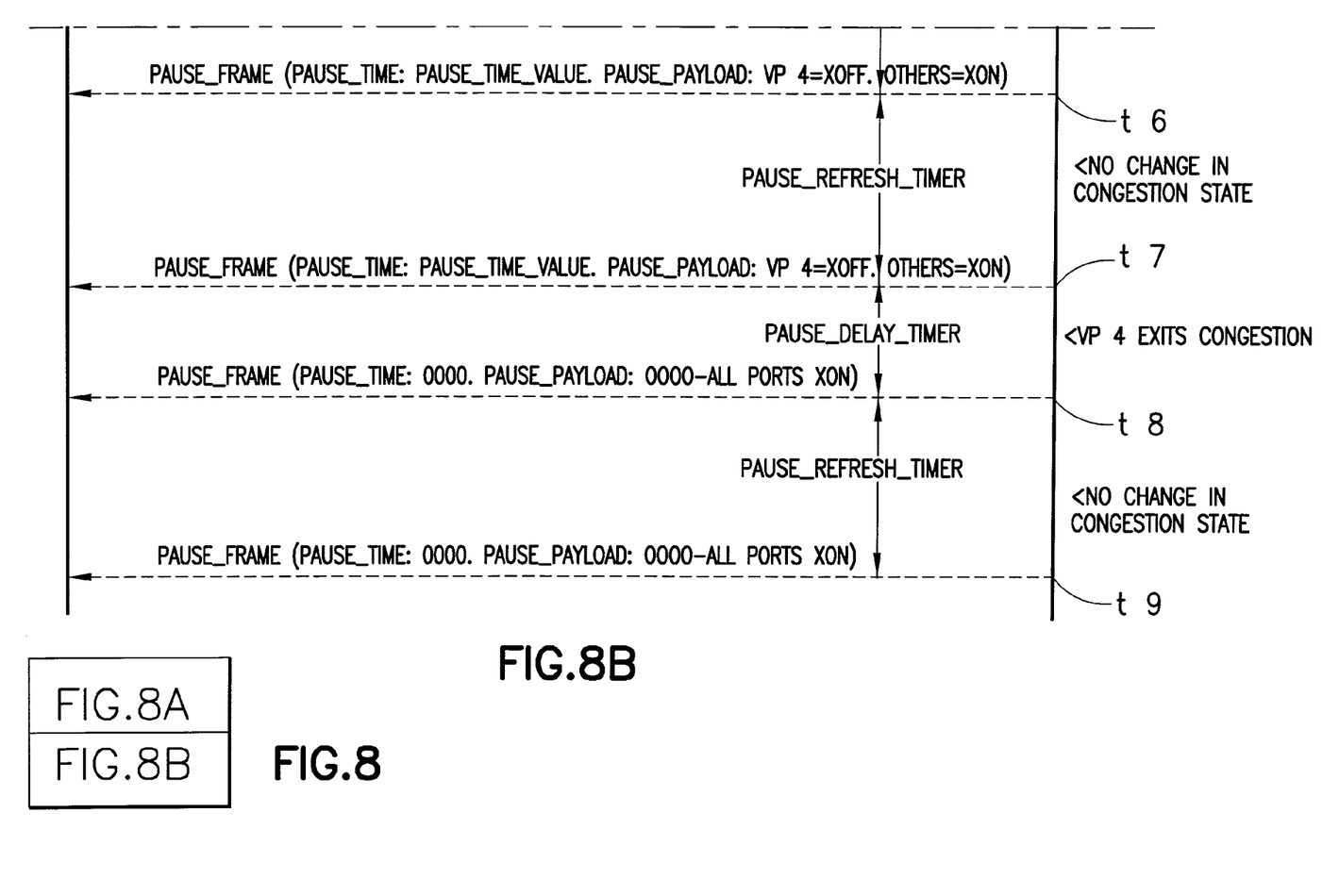
FIG. 8 is a schematic illustration of pause frame generation using timers according to the invention.
Figure 8A:
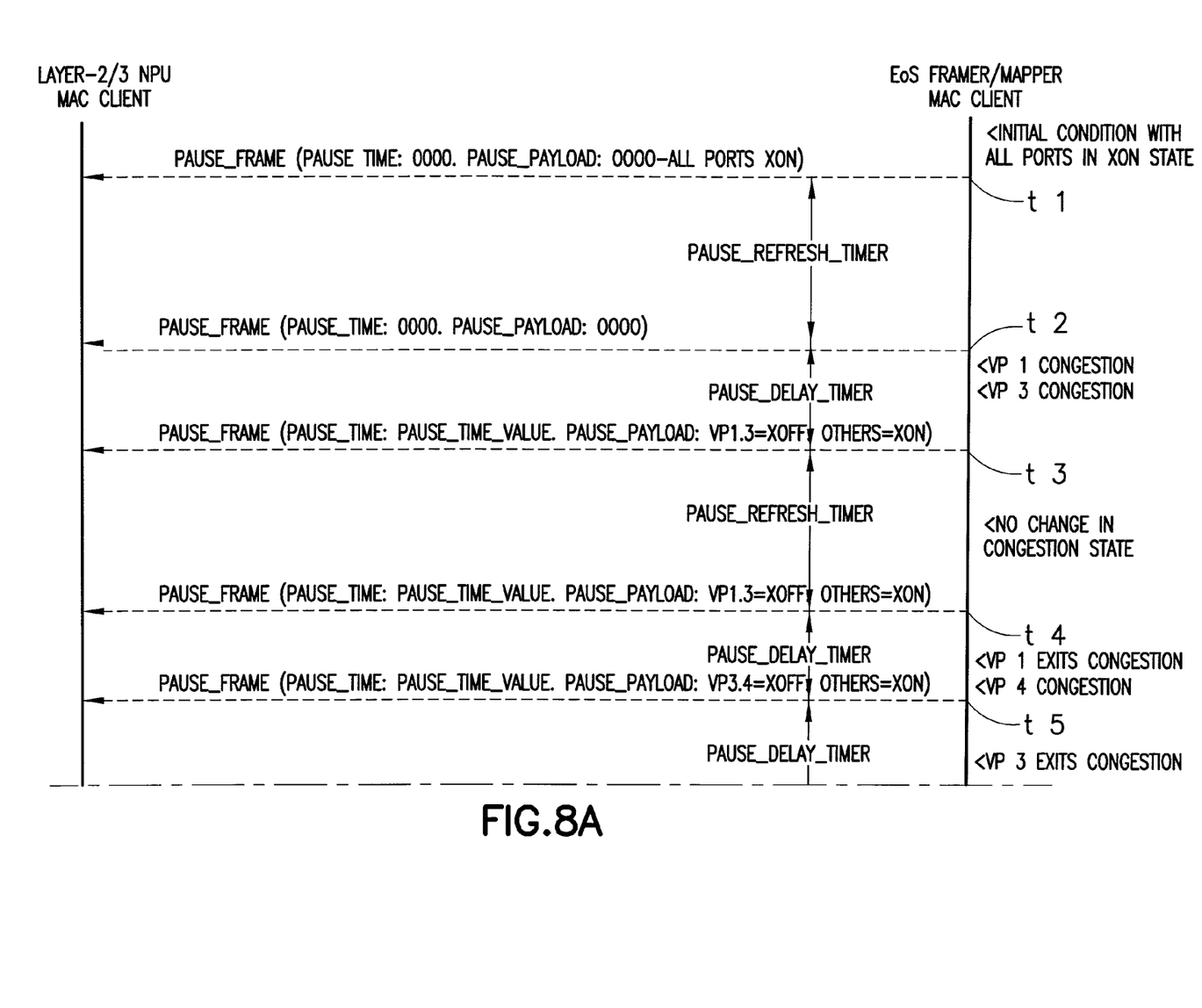

FIG. 8 illustrates an example of the flow of PAUSE control frames from the framer/mapper to the NPU. Reading FIG. 8 from top to bottom and right to left, the sequence begins with the initial condition where all ports are in the XON state. At time t1, a PAUSE control frame indicating all ports XON is sent (by the congestion monitor 12e shown in FIGS. 1 and 2) with the Pause Timer=0000 and all of the Pause State bits=0. After the expiration of the Pause refresh time t2-t1, the same control frame is sent (by the congestion monitor 12e shown in FIGS. 1 and 2) at time t2. At some time following t2, virtual ports 1 and 3 become congested. Before sending a control frame indicating congestion, the congestion monitor 12e (shown in FIGS. 1 and 2) waits for the expiration of the Pause Delay Timer which is reset each time the refresh frame is sent. The Pause Delay Timer provides a window within which congestion may be cleared without putting a port in an XOFF state. Upon the expiration of the Pause Delay Timer at t3, a PAUSE control frame is sent (by the congestion monitor 12e shown in FIGS. 1 and 2) indicating that ports 1 and 3 should be put in XOFF state with the Pause Timer=Pause Time Value. Transmission of packets destined for ports 1 and 2 is temporarily halted.

So long as there is no change in the congestion status of the virtual ports, the Pause Refresh Timer is allowed to expire before another control frame is sent. Thus, at t4, the same control frame that was sent at t3 is sent again, indicating that conditions are the same as at t3. At some time following t4, port 1 becomes decongested and port 4 becomes congested. Upon the expiration of the Pause Delay Timer, a new PAUSE control frame is sent at t5 indicating the new status of the ports and setting the Pause Timer to the Pause Time Value. Transmission of packets destined for port 1 is resumed and transmission of packets destined for port 4 is temporarily halted.

At some time following t5, port 3 becomes decongested. Thus, upon the expiration of the Pause Delay Timer, a new PAUSE control frame is sent at t6 indicating the new status of the ports and setting the Pause Timer to the Pause Time Value. Transmission of packets destined for port 3 is temporarily halted. Following time t6 until the expiration of the Pause Refresh Timer at t7, there is no change in the congestion status of the ports. Therefore, at t7, the same control frame that was sent at t6 is sent again.

At some point following t7, port 4 becomes decongested. Thus, upon the expiration of the Pause Delay Timer, a new PAUSE control frame is sent at t8 indicating the new status of the ports (all decongested) and setting the Pause Timer to 0000. Transmission is resumed for all ports. Following time t8 until the expiration of the Pause Refresh Timer at t9, there is no change in the congestion status of the ports. Therefore, at t9, the same control frame that was sent at t8 is sent again.

In applications where End-to-End PAUSE Control is not allowed to be transported across the Sonet/SDH network, PAUSE frames arriving from the Sonet/SDH network shall be discarded and no further action taken. The PAUSE frames sent over the ETHERNET interface shall reflect only the local Upstream Rx buffer congestion.

In applications where End-to-End PAUSE Control is allowed, the Rx Congestion Monitor (12e shown in FIGS. 1 and 2) must perform a PAUSE reconciliation between the remote pause condition arriving from the Sonet/SDH network and the local upstream Rx buffer congestion managed locally. When the Sonet/SDH side is not asserting a pause condition, PAUSE frames sent on the ETHERNET interface follow the mux-mode format and scheme described above with reference to FIGS. 7 and 8. When the Sonet/SDH side is asserting a pause, the "Rx Congestion Monitor" function must reconcile both local and remote congestion conditions on a per virtual port basis (VCG). To perform reconciliation, a Remote_Pause_Timer (per VCG) must be maintained reflecting the XOFF period identified in the Pause_Time field requested from the remote side across the Sonet/SDH network. This timer is decremented using a time quantum of 1 tick per 512 bit times for a 10 Mbit interface (i.e. 51.2 μs per tick). As long as the remote side is asserting/refreshing XOFF, the mux-mode PAUSE frames sent on the ETHERNET interface will be in the XOFF state. When the remote side is asserting the XON state, i.e. Remote_Pause_Timer (per VCG) decrements or is set to zero, PAUSE frames sent on the ETHERNET interface should reflect the state of local congestion maintained for the Upstream Rx buffer for the virtual port/VCG.

Figure 9:
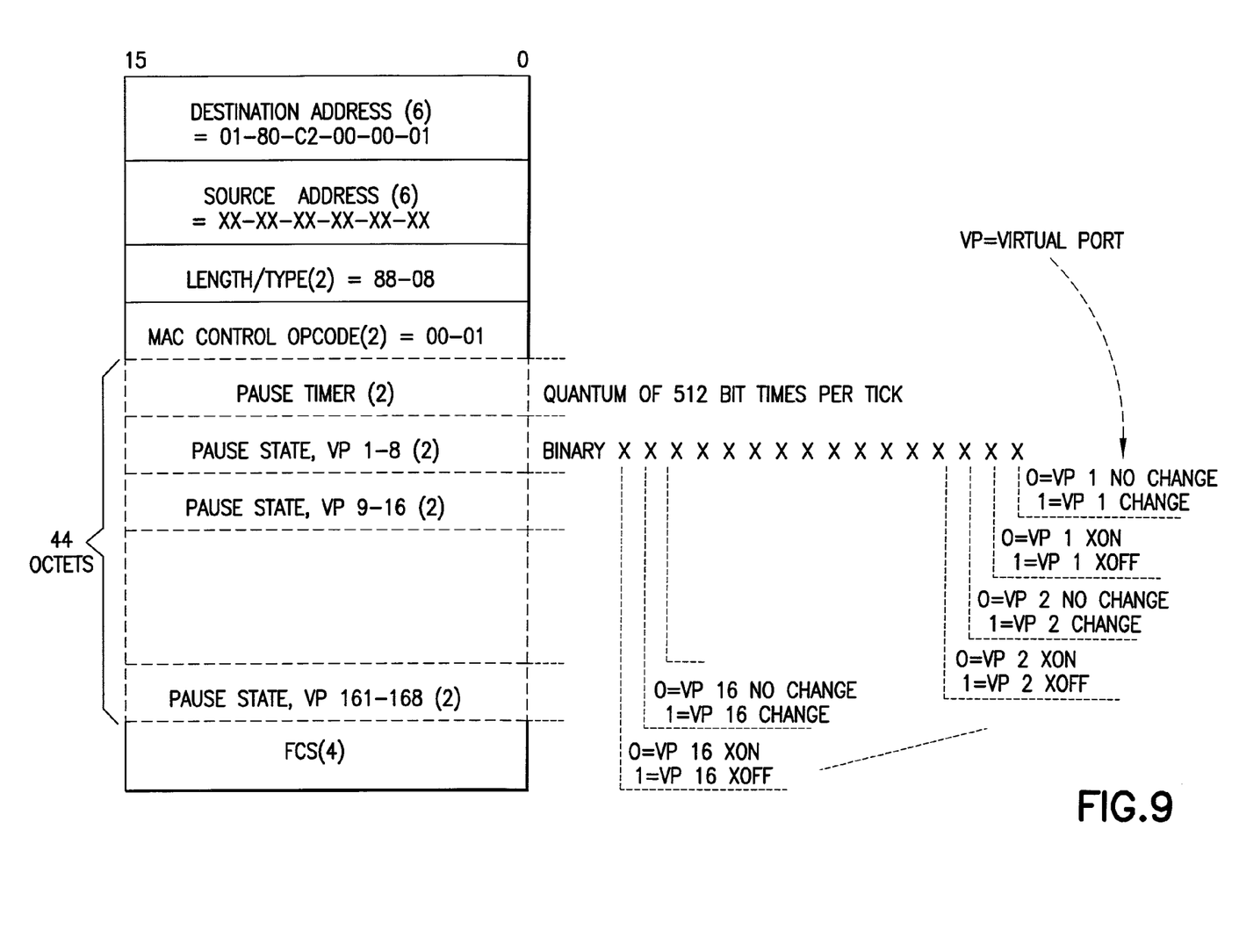
FIG. 9 is a schematic illustration of an alternative modified pause frame according to the invention.

FIG. 9 illustrates an alternative Pause Control Frame where each port is allocated two bits in the message payload to identify XON, XOFF, and NO-CHANGE state. The NO-CHANGE state allows better control of the pause delays imposed on virtual ports at the time the delay is imposed. For example, when virtual ports 1, 3, and 4 require backpressure during interval "X", a single Pause frame is generated which tells each of these ports to delay by the time specified in the Pause Timer. If during interval "Y", some time later, virtual ports 6 and 7 also need to be backpressured, VP's 1, 3, and 4 are already into their countdown period and are assigned NO-CHANGE along with all other ports that were not in a backpressure state. VP's 6 and 7 begin a new backpressure time period with an initial (high) Pause_Timer.

This implementation of the PAUSE control frame is not preferred for two reasons. First, it is advantageous to use a single bit encoding for XON/XOFF backpressure to have a simple and compact representation within the Pause Frame payload. Second, since XOFF is nominally asserted for the maximum Pause_Timer, this can be continued for all ports in the congestion state until Rx FIFO congestion is alleviated and XON is asserted on all ports below the XON threshold.

There have been described and illustrated herein several embodiments of methods and apparatus for controlling the flow of multiple signal sources over a single full duplex ETHERNET link. While particular embodiments of the invention have been described, it is not intended that the invention be limited thereto, as it is intended that the invention be as broad in scope as the art will allow and that the specification be read likewise. Thus, while the invention has been described with reference to gigabit ETHERNET, it will be appreciated that the invention could be applied to ETHERNET links of different bandwidth as well. In addition, while particular types of modified MAC frames have been disclosed, it will be understood other types of modified MAC frames might be able to obtain similar results. Also, while a particular modified PAUSE control frame is preferred, it will be recognized that other formats may be able to obtain similar results if designed with the present disclosure in mind. It will therefore be appreciated by those skilled in the art that yet other modifications could be made to the provided invention without deviating from its spirit and scope as claimed.

What is claimed is:

1. Method for providing transmit flow control for multiple signal streams over a single Ethernet link, comprising:
 receiving PDUs (protocol data units) from multiple signal streams at a first MAC (media access control) client;
 encapsulating each PDU in a MAC frame which includes an identification of the signal stream to which the PDU belongs;
 transmitting the MAC frames over an Ethernet link to a second MAC client;
 receiving the MAC frames at the second MAC client;
 decapsulating the PDUs in the MAC frames received at the second MAC client;
 providing a plurality of buffers uniquely associated with the multiple signal streams supplying PDUs to the first MAC client;
 for each given PDU decapsulated from the MAC frames received at the second MAC client, forwarding the given PDU to a select one of said plurality of buffers that is associated with the signal stream from which the given PDU originated in accordance with the identifier of the MAC frame from which the given PDU was decapsulated;
 monitoring a fullness condition of each one of said plurality of buffers; and
 transmitting a Pause control frame from the second MAC client to the first MAC client, the Pause control frame indicating the fullness condition of each one of said plurality of buffers.

2. The method according to claim 1, further comprising:
 controlling the flow of signal streams by temporarily halting the transmission of PDUs belonging to signal streams associated with buffers which are indicated as congested by the Pause control frame.

3. The method according to claim 1, wherein:
 each MAC frame includes a pre-pended address field which identifies the signal stream with which the encapsulated PDU is associated.

4. The method according to claim 1, wherein:
 the identification is mapped onto an IEEE 802.1Q VLAN (virtual local area network) tag within the MAC frame.

5. The method according to claim 1, wherein:
 the identification is an IEEE 802.1Q VLAN (virtual local area network) tag within the MAC frame which is mapped to a port.

6. The method according to claim 1, wherein:
 the Pause control frame includes a single bit identifier for each buffer for indicating the fullness condition of the associated buffer.

7. The method according to claim 6, wherein:
 each single bit identifies an Xon/Xoff condition.

8. The method according to claim 1, wherein:
 the Pause control frame includes a two bit identifier for each buffer for indicating the fullness condition of the associated buffer.

9. The method according to claim 8, wherein:
 each two bit identifier identifies an Xon/Xoff/NoChange condition.

10. The method according to claim 1, wherein:
 the Pause control frame includes a Pause timer value.

11. The method according to claim 10, wherein:
 the Pause timer value is set to zero when the Pause control frame indicates that no buffer is experiencing congestion.

12. The method according to claim 11, wherein:
 the Pause timer value is set to a pre-programmed Pause Time Value when the Pause control frame indicates that at least one buffer is experiencing congestion.

13. The method according to claim 12, further comprising:
 setting a pause refresh timer each time a Pause control frame is transmitted; and
 transmitting a Pause control frame at the expiration of the pause refresh timer if no Pause control frame was transmitted since the pause refresh timer was set.

14. The method according to claim 13, further comprising:
 setting a pause delay timer each time a Pause control frame is transmitted; and
 transmitting a Pause control frame at the expiration of the pause delay timer if congestion conditions have changed since the last Pause control frame was transmitted.

15. The method according to claim 14, wherein:
 the pause delay timer is of shorter duration than the pause refresh timer.

16. A method according to claim 1, further comprising:
 receiving the Pause control frame at the first MAC client; and
 processing the Pause control frame at the first MAC client wherein PDUs from at least one particular signal stream whose corresponding buffer is full as indicated by the received Pause control frame are not transmitted as part of MAC frames communicated from the first MAC client to the second MAC client over the Ethernet link.

17. A method for providing flow control for multiple signal streams over a single Ethernet link, comprising:
 receiving MAC frames from a MAC client, each frame containing a PDU belonging to one of the multiple signal streams and an identifier of the signal stream to which the PDU belongs;
 decapsulating the PDUs in the received MAC frames;
 providing a plurality of buffers uniquely associated with the multiple signal streams;
 for each given PDU decapsulated from the received MAC frames, forwarding the given PDU to a select one of said plurality of buffers that is associated with the signal stream from which the given PDU belongs in accordance with the identifier of the MAC frame from which the given PDU was decapsulated;
 monitoring a fullness condition of each one of said plurality of buffers; and
 transmitting a Pause control frame from the MAC client, the Pause control frame indicating the fullness condition of each one of said plurality of buffers.

18. The method of claim 17, wherein:
 the Pause control frame includes a single bit identifier for each buffer for indicating the fullness condition of the associated buffer.

19. The method according to claim 18, wherein:
 each single bit identifies an Xon/Xoff condition.

20. The method according to claim 17, wherein:
 the Pause control frame includes a two bit identifier for each buffer for indicating the fullness condition of the associated buffer.

21. The method according to claim 20, wherein:
 each two bit identifier identifies an Xon/Xoff/NoChange condition.

22. The method according to claim 17, wherein:
 the Pause control frame includes a Pause timer value.

23. The method according to claim 22, wherein:
 the Pause timer value is set to zero when the Pause control frame indicates that no buffer is experiencing congestion.

24. The method according to claim 23, wherein:
 the Pause timer value is set to a pre-programmed Pause Time Value when the Pause control frame indicates that at least one buffer is experiencing congestion.

25. The method according to claim 24, further comprising:
 setting a pause refresh timer each time a Pause control frame is transmitted; and
 transmitting a Pause control frame at the expiration of the pause refresh timer if no Pause control frame was transmitted since the pause refresh timer was set.

26. The method according to claim 25, further comprising:
 setting a pause delay timer each time a Pause control frame is transmitted; and
 transmitting a Pause control frame at the expiration of the pause delay timer if congestion conditions have changed since the last Pause control frame was transmitted.

27. The method according to claim 26, wherein:
 the pause delay timer is of shorter duration than the pause refresh timer.

28. A method according to claim 17, further comprising:
 receiving the Pause control frame at the MAC client; and
 processing the Pause control frame at the MAC client wherein PDUs from at least one particular signal stream whose corresponding buffer is full as indicated by the received Pause control frame are not transmitted as part of MAC frames communicated from the MAC client over the Ethernet link.

29. A system for providing flow control for multiple signal streams over a single Ethernet link, comprising:
 a first MAC (media access control) client; and
 a second MAC client coupled to said first MAC client by the Ethernet link,
 said first MAC client having
  means for receiving PDUs (protocol data units) from multiple signal streams,
  means for encapsulating each PDU in a MAC frame which includes an identification of the signal stream to which the PDU belongs,
  means for transmitting the MAC frames over the Ethernet link to said second MAC client,
 said second MAC client having
  means for receiving the MAC frames transmitted by said first MAC client,
  means for decapsulating the PDUs in the MAC frames received at the second MAC client,
  a plurality of buffers uniquely associated with the multiple signal streams supplying PDUs to the first MAC client;
  means, operating one each given PDU decapsulated from the MAC frames received at the second MAC client, for forwarding the given PDU to a select one of said plurality of buffers that is associated with the signal stream from which the given PDU originated in accordance with the identifier of the MAC frame from which the given PDU was decapsulated,
  means for monitoring a fullness condition of each one of said plurality of buffers, and
  means for transmitting a Pause control frame to said first MAC client, the Pause control frame indicating the fullness condition of each one of said plurality of buffers.

30. The system according to claim 29, further comprising:
 means for receiving the Pause control frame at the first MAC client; and
 means for processing the Pause control frame at the first MAC client wherein PDUs from at least one particular signal stream whose corresponding buffer is full as indicated by the received Pause control frame are not transmitted as part of MAC frames communicated over the Ethernet link from the first MAC client to the second MAC client.

31. The system according to claim 29, wherein:
 each MAC frame includes a pre-pended address field which identifies the stream with which the encapsulated PDU is associated.

32. The system according to claim 29, wherein:
 the identification is mapped onto an IEEE 802.1Q VLAN (virtual local area network) tag within the MAC frame.

33. The system according to claim 29, wherein:
 the identification is an IEEE 802.1Q VLAN (virtual local area network) tag within the MAC frame which is mapped to a port.

34. The system according to claim 33, wherein:
 the Pause control frame includes a two bit identifier for each buffer for indicating the fullness condition of the associated buffer.

35. The system according to claim 34, wherein:
 each two bit identifier identifies an Xon/Xoff/NoChange condition.

36. The system according to claim 33, wherein:
 the Pause control frame includes a Pause timer value.

37. The system according to claim 36, wherein:
the Pause timer value is set to zero when the Pause control frame indicates that no buffer is experiencing congestion.

38. The system according to claim 37, wherein:
the Pause timer value is set to a pre-programmed Pause Time Value when the Pause control frame indicates that at least one buffer is experiencing congestion.

39. The system according to claim 38, wherein:
said second MAC client includes means for setting a pause refresh timer each time a Pause control frame is transmitted,
a Pause control frame being transmitted at the expiration of the pause refresh timer if no Pause control frame was transmitted since the pause refresh timer was set.

40. The system according to claim 38, wherein:
said second MAC client includes means for setting a pause delay timer each time a Pause control frame is transmitted,
a Pause control frame being transmitted at the expiration of the pause delay timer if congestion conditions have changed since the last Pause control frame was transmitted.

41. The system according to claim 40, wherein:
the pause delay timer is of shorter duration than the pause refresh timer.

42. The system according to claim 29, wherein:
the Pause control frame includes a single bit identifier for each buffer for indicating the fullness condition of the associated buffer.

43. The system according to claim 42, wherein:
each single bit identifies an Xon/Xoff condition.

44. A system for providing flow control for multiple signal streams over a single Ethernet link, comprising:
means for receiving MAC frames from a MAC client over the Ethernet link, each frame containing a PDU belonging to one of the multiple signal streams and an identifier of the signal stream to which the PDU belongs;
a plurality of buffers uniquely associated with the multiple signal streams;
means for decapsulating the PDUs in the received MAC frames;
means, operating on each given PDU decapsulated from the received MAC frames, for forwarding the given PDU to a select one of said plurality of buffers that is associated with the signal stream from which the given PDU belongs in accordance with the identifier of the MAC frame from which the given PDU was decapsulated;
means for monitoring a fullness condition of each one of said plurality of buffers; and
means for transmitting a Pause control frame to the MAC client, the Pause control frame indicating the fullness condition of each one of said plurality of buffers.

45. The system according to claim 44, wherein:
the Pause control frame includes a single bit identifier for each buffer for indicating the fullness condition of the associated buffer.

46. The system according to claim 45, wherein:
each single bit identifies an Xon/Xoff condition.

47. The system according to claim 44, wherein:
the Pause control frame includes a two bit identifier for each buffer for indicating the fullness condition of the associated buffer.

48. The system according to claim 47, wherein:
each two bit identifier identifies an Xon/Xoff/NoChange condition.

49. The system according to claim 44, wherein:
the Pause control frame includes a Pause timer value.

50. The system according to claim 49, wherein:
the Pause timer value is set to zero when the Pause control frame indicates that no buffer is experiencing congestion.

51. The system according to claim 50, wherein:
the Pause timer value is set to a pre-programmed Pause Time Value when the Pause control frame indicates that at least one buffer is experiencing congestion.

52. The system according to claim 51, further comprising:
a pause refresh timer; and
means for resetting the pause refresh timer each time a Pause control frame is transmitted, wherein
a Pause control frame is transmitted at the expiration of the pause refresh timer if no Pause control frame was transmitted since the pause refresh timer was set.

53. The system according to claim 52, further comprising:
a pause delay timer; and
means for resetting the pause delay timer each time a Pause control frame is transmitted, wherein
a Pause control frame is transmitted at the expiration of the pause delay timer if congestion conditions have changed since the last Pause control frame was transmitted.

54. The system according to claim 53, wherein:
the pause delay timer is of shorter duration than the pause refresh timer.

55. A system according to claim 44, further comprising:
means for receiving the Pause control frame at the MAC client; and
means for processing the Pause control frame at the MAC client wherein PDUs from at least one particular signal stream whose corresponding buffer is full as indicated by the received Pause control frame are not transmitted as part of MAC frames communicated from the MAC client over the Ethernet link.

* * * * *

UNITED STATES PATENT AND TRADEMARK OFFICE
CERTIFICATE OF CORRECTION

PATENT NO.        : 7,649,843 B2                                      Page 1 of 1
APPLICATION NO.   : 10/775013
DATED             : January 19, 2010
INVENTOR(S)       : Shanley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1468 days.

Signed and Sealed this

Twenty-third Day of November, 2010

David J. Kappos
*Director of the United States Patent and Trademark Office*